US010836663B2

(12) United States Patent
Reilly et al.

(10) Patent No.: US 10,836,663 B2
(45) Date of Patent: *Nov. 17, 2020

(54) WASTEWATER TREATMENT WITH MODULAR MEMBRANE BIOREACTOR CARTRIDGES

(71) Applicant: Liberty Evans, LLC, Vancouver, WA (US)

(72) Inventors: James Philip Reilly, Vancouver, WA (US); Victoria Ann Jelderks, Vancouver, WA (US)

(73) Assignee: Liberty Evans, LLC, Seattle, WA (US)

( * ) Notice: Subject to any disclaimer, the term of this patent is extended or adjusted under 35 U.S.C. 154(b) by 80 days.

This patent is subject to a terminal disclaimer.

(21) Appl. No.: 16/135,814

(22) Filed: Sep. 19, 2018

(65) Prior Publication Data

US 2019/0016618 A1 Jan. 17, 2019

Related U.S. Application Data

(63) Continuation of application No. 15/408,009, filed on Jan. 17, 2017, now Pat. No. 10,099,951, which is a continuation of application No. 15/074,561, filed on Mar. 18, 2016, now Pat. No. 9,828,268, which is a continuation of application No. 14/216,334, filed on Mar. 17, 2014, now Pat. No. 9,321,666.

(60) Provisional application No. 61/792,873, filed on Mar. 15, 2013.

(51) Int. Cl.
*C02F 3/00* (2006.01)
*C02F 3/12* (2006.01)

(52) U.S. Cl.
CPC ............ *C02F 3/006* (2013.01); *C02F 3/1268* (2013.01); *C02F 2201/006* (2013.01); *C02F 2201/007* (2013.01); *C02F 2203/006* (2013.01); *C02F 2209/00* (2013.01); *C02F 2209/40* (2013.01); *Y02W 10/10* (2015.05)

(58) Field of Classification Search
None
See application file for complete search history.

(56) References Cited

U.S. PATENT DOCUMENTS

| | | |
|---|---|---|
| 2,328,460 A | 8/1943 | Kidd |
| 3,902,365 A | 9/1975 | Knauth |
| 5,277,797 A | 1/1994 | Hargest |

(Continued)

OTHER PUBLICATIONS

"U.S. Appl. No. 14/216,334, Notice of Allowance dated Dec. 18, 2015", 10 pgs.

(Continued)

*Primary Examiner* — Chester T Barry
(74) *Attorney, Agent, or Firm* — Schwegman Lundberg & Woessner, P.A.

(57) ABSTRACT

Embodiments of the invention describe an apparatus, method, and system of wastewater treatment using modular membrane bioreactor (MBR) cartridges. In one embodiment, said method of wastewater treatment includes adjusting the number of activated modular MBR cartridges in a container and adjusting the wastewater processing rate of the container to dynamically change the throughput of a fixed-size wastewater processing container. According to one embodiment, said method can include utilizing modular MBR cartridges to provide for a fault-tolerant wastewater treatment container.

20 Claims, 5 Drawing Sheets

(56) References Cited

U.S. PATENT DOCUMENTS

| | | | |
|---|---|---|---|
| 5,492,632 | A | 2/1996 | Reber et al. |
| 5,902,487 | A | 5/1999 | Pickering |
| 6,185,946 | B1 | 2/2001 | Hartman |
| 8,696,873 | B2 | 4/2014 | Karlström et al. |
| 9,321,666 | B1 * | 4/2016 | Reilly .................... C02F 3/006 |
| 9,828,268 | B2 * | 11/2017 | Reilly .................... C02F 3/006 |
| 10,099,951 | B2 * | 10/2018 | Reilly .................... C02F 3/006 |
| 2004/0079706 | A1 | 4/2004 | Mairal et al. |
| 2012/0291436 | A1 | 11/2012 | Hirson et al. |
| 2013/0284677 | A1 | 10/2013 | Snydmiller et al. |
| 2016/0236956 | A1 | 8/2016 | Reilly et al. |
| 2017/0121193 | A1 | 5/2017 | Reilly |

OTHER PUBLICATIONS

"U.S. Appl. No. 15/074,561, Final Office Action dated Jan. 9, 2017", 7 pgs.

"U.S. Appl. No. 15/074,561, Non Final Office Action dated Apr. 3, 2017", 5 pgs.

"U.S. Appl. No. 15/074,561, Non Final Office Action dated Oct. 7, 2016", 4 pgs.

"U.S. Appl. No. 15/074,561, Notice of Allowance dated Jul. 27, 2017", 6 pgs.

"U.S. Appl. No. 15/074,561, Response filed Mar. 9, 2017 to Final Office Action dated Jan. 9, 2017", 8 pgs.

"U.S. Appl. No. 15/074,561, Response filed Jul. 3, 2017 to Non Final Office Action dated Apr. 3, 2017", 8 pgs.

"U.S. Appl. No. 15/074,561, Response filed Dec. 6, 2016 to Non Final Office Action dated Oct. 7, 2016", 9 pgs.

"U.S. Appl. No. 15/408,009, Notice of Allowability dated Jan. 25, 2018", 3 pgs.

"U.S. Appl. No. 15/408,009, Notice of Allowance dated Jan. 8, 2018", 7 pgs.

"U.S. Appl. No. 15/408,009, Notice of Allowance dated Jun. 12, 2018", 7 pgs.

"U.S. Appl. No. 15/408,009, Preliminary Amendment filed Jan. 18, 2017", 6 pgs.

* cited by examiner

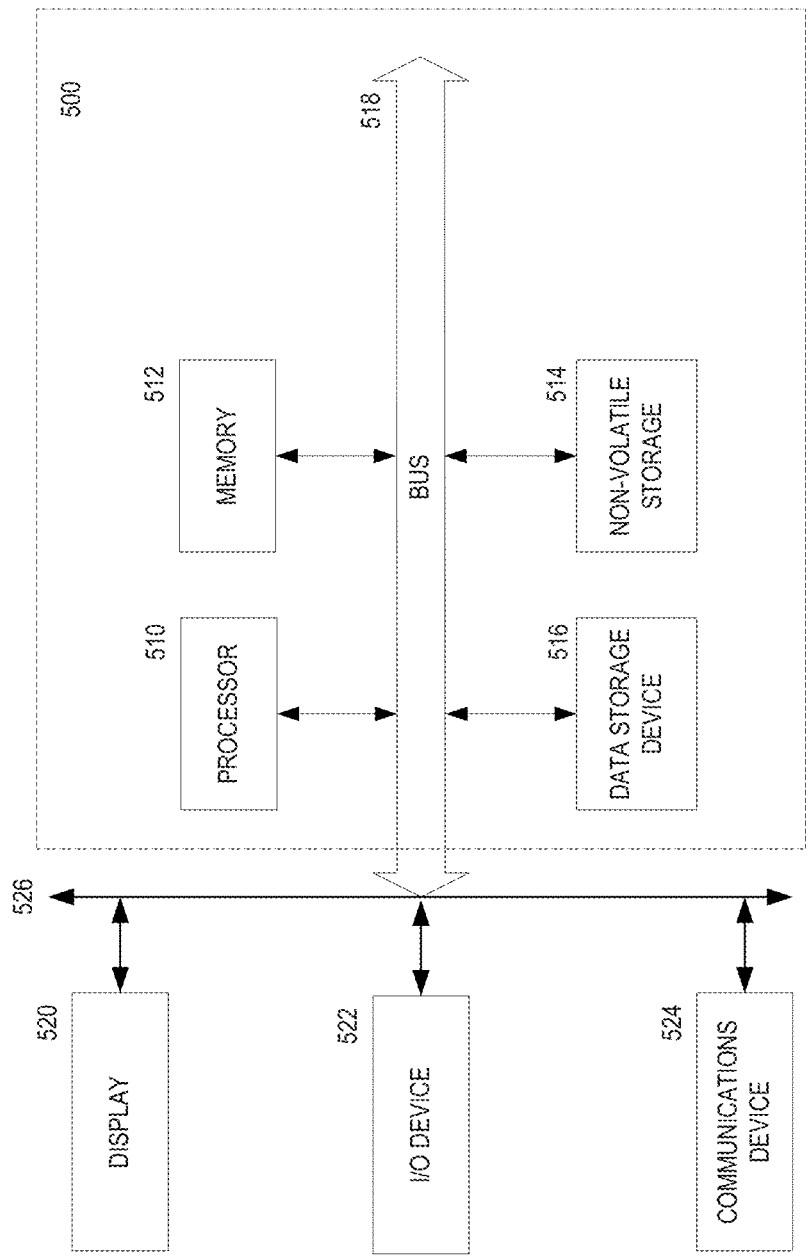

WASTEWATER TREATMENT WITH MODULAR MEMBRANE BIOREACTOR CARTRIDGES

RELATED APPLICATIONS

This application is a Continuation of U.S. patent application Ser. No. 15/408,009, filed Jan. 17, 2017, now U.S. Pat. No. 10,099,951, which application is a Continuation of U.S. patent application Ser. No. 15/074,561, filed Mar. 18, 2016, now issued as U.S. Pat. No. 9,828,268, which application is a Continuation of U.S. patent application Ser. No. 14/216,334, filed Mar. 17, 2014, now issued as U.S. Pat. No. 9,321,666, which claims priority to U.S. Provisional Application No. 61/792,873, filed on Mar. 15, 2012, entitled "WASTEWATER TREATMENT WITH MODULAR MEMBRANE BIOREACTOR CARTRIDGES," each of which is incorporated by reference herein in its entirety.

TECHNICAL FIELD

This disclosure relates generally to the field of wastewater treatment, and in particular but not exclusively, relates to wastewater treatment via membrane bioreactor (MBR) filtration.

BACKGROUND

Wastewater treatment plants (WWTPs) are utilized to process and purify water from industrial operations and municipal sources. Incoming wastewater can vary in volume and density. For example, seasonal storms may cause an increase in volume and decrease in density of incoming wastewater.

Some WWTPs include treatment with membrane bioreactor (MBR) filters. In current implementations, in order to increase a WWTP's capacity to filter wastewater with MBR filters, additional or larger volume containers are required. As a result, a WWTP has to be designed to not only accommodate current demand, but any foreseeable increased demand. This increases the cost required to design, construct, and maintain the WWTP.

DESCRIPTION OF THE DRAWINGS

Non-limiting and non-exhaustive embodiments of the invention are described with reference to the following figures, wherein like reference numerals refer to like parts throughout the various views unless otherwise specified. It should be appreciated that the following figures may not be drawn to scale.

FIG. 5 is an illustration of a system to utilize and/or implement an embodiment of the invention.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

Embodiments of an apparatus, system, and method for wastewater treatment with modular membrane bioreactor (MBR) cartridges are described herein. In one embodiment, modular MBR cartridges can be dynamically activated or deactivated to enable variable throughput for a fixed-size wastewater processing container. According to one embodiment, modular MBR cartridges enable fault tolerant wastewater processing containers.

In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
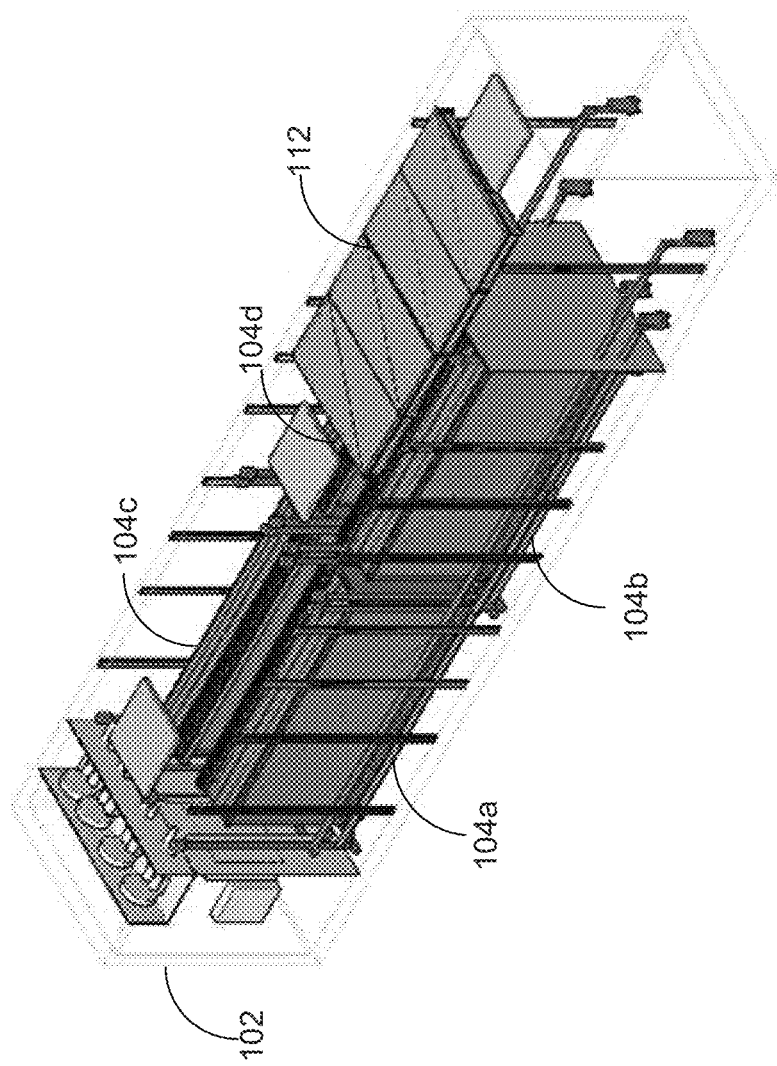
FIG. 1 is a diagram of a modular wastewater treatment container with modular membrane bioreactor (MBR) cartridges according to an embodiment of the invention.

FIG. 1 is a diagram of a modular wastewater treatment container with modular membrane bioreactor (MBR) cartridges according to an embodiment of the invention.

Container 102 can be installed as part of a larger WWTP. A WWTP may include a plurality of wastewater treatment subsystems, each executing a specific wastewater treatment function. For example, a WWTP can include a subsystem that performs MBR filtration. A WWTP can include a plurality of modular containers which each implement one or more of the wastewater treatment subsystems, stages, or methods. For example, illustrated container 102 is a modular container for implementing MBR filtration in a WWTP. In one embodiment, container 102 is one of a plurality of modular MBR containers in a WWTP. According to one embodiment, container 102 can also implement other wastewater treatment subsystems, stages, or methods, in addition to MBR filtration.

Container 102 includes a plurality of modular MBR cartridges 104a-d. According to this embodiment, modular MBR cartridges 104a-d are for filtering influent of container 102 by improving activated sludge wastewater treatment processes, combining bio-reactive treatment processes with membrane separation processes. MBR cartridges 104a-d may be, for example, removable cartridges comprising MBR filters. Said MBR cartridges provide flexibility in design and/or use. Although four MBR cartridges 104a-d are shown in FIG. 1, any number of modular MBR cartridges may be used. In one embodiment, modular MBR cartridges 104a-d separate and concentrate biomass by removing wastewater (as opposed to using settling processes). According to this embodiment, container 102 may retain particulate matter, remove a high percentage of pathogens, and remove dissolved materials from the wastewater influent.

In this embodiment, container 102 includes headworks 112 for receiving wastewater from an influent source. In FIG. 1, four headworks are shown, but other numbers of headworks may be used. A greater number of headworks may be used to facilitate a higher rate of receiving influent into container 102. Centrifugal permeate pumps may be used to strain permeate from the wastewater, and transfer the permeate downstream to a ultra-violet disinfection system (not shown) to discharge. Although a modular MBR container is illustrated in FIG. 1, embodiments of the invention as described herein can be implemented for any type of WWTP or any type of container within a WWTP.

Figure 2:
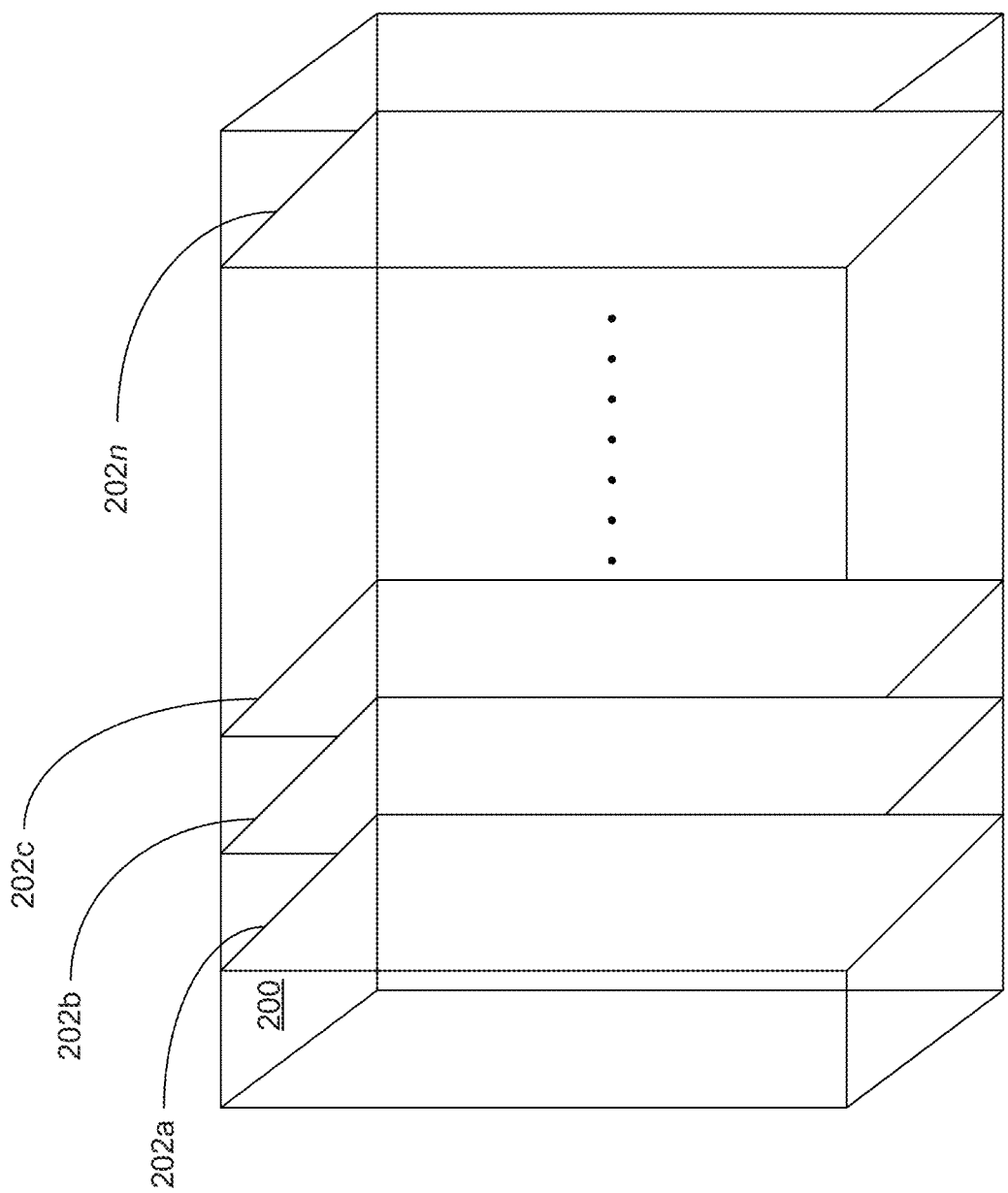
FIG. 2 is a block diagram of a modular MBR cartridge according to an embodiment of the invention.

FIG. 2 is a block diagram of a modular MBR cartridge. Modular MBR cartridge 200 includes MBR filters 202a-202n. Although modular MBR cartridge 200 is illustrated with a plurality of MBR filters, any other number of MBR filters (including a single filter) may be included in modular MBR cartridge 200. In embodiments with a plurality of MBR filters such as cartridge 200, the plurality of MBR filters can be coupled in any manner. For example, MBR filters 202a-202n may be coupled via a frame or housing.

MBR filters 202a-n may include membranes of any material (e.g., synthetic or natural) or porosity (e.g., 0.08 μm) determined based on system requirements (e.g., quality requirements of the effluent). For example, MBR filters 202a-n may utilize reverse osmosis, nanofiltration, ultrafiltration, microfiltration, or any other solid/liquid separation membranes known in the art. In one embodiment, membranes are used which can withstand additional suction pressure (e.g., 2 times standard suction pressure) for periods of time.

Figure 3:
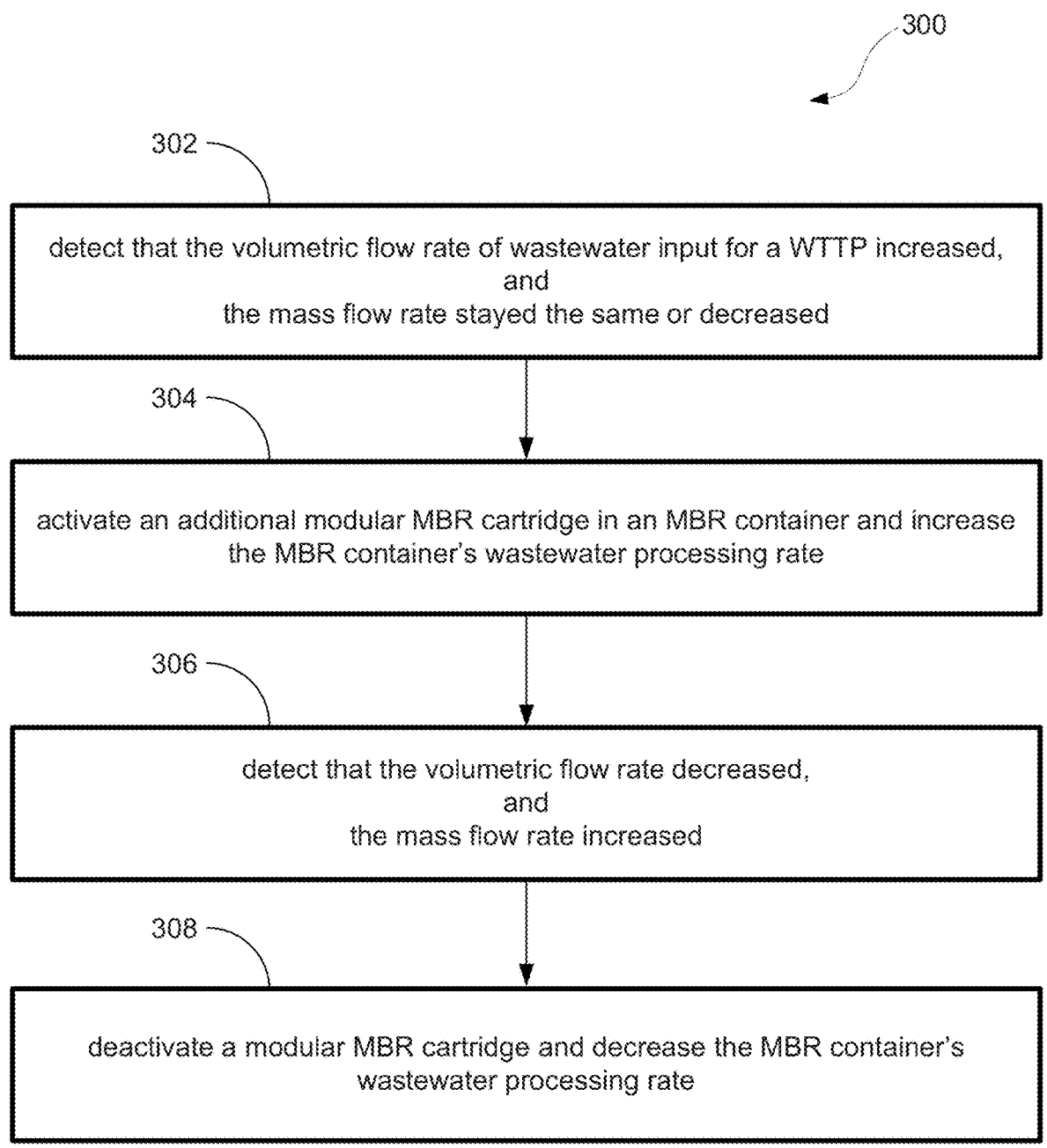
FIG. 3 is a flow diagram of a method of treating variable flow rates of wastewater with modular MBR cartridges according to one embodiment of the invention.

FIG. 3 is a flow diagram of a method of treating variable flow rates of wastewater with modular MBR cartridges according to one embodiment of the invention.

Flow diagrams as illustrated herein provide examples of sequences of various process actions. Although shown in a particular sequence or order, unless otherwise specified, the order of the actions can be modified. Thus, the illustrated implementations should be understood only as examples, and the illustrated processes can be performed in a different order, and some actions may be performed in parallel. Additionally, one or more actions can be omitted in various embodiments of the invention; thus, not all actions are required in every implementation. Other process flows are possible.

Method 300 detects changes in the volumetric and mass flow rate of wastewater and adjusts the number of activated MBR cartridges in a container and the flow rate that the container is set to process wastewater in response to those changes. In one embodiment, method 300 monitors the volumetric and mass flow rates of wastewater input for a WWTP. Monitoring the volumetric and mass flow rates of wastewater input can be achieved with sensors, and in one embodiment, with a computer system such as system 500 of FIG. 5. Method 300 detects whether the volumetric flow rate has increased, and whether the mass flow rate has stayed the same or decreased, 302. For example, a system can detect a "high tide" condition in which the wastewater coming into the WWTP is diluted with a high volume of water, and therefore has a lower density. A high tide condition can result from, for example, seasonal rain.

In response to detecting that the volumetric flow rate has increased and the mass flow rate has stayed the same or decreased, an additional modular MBR cartridge in an MBR container is activated, and the MBR container's wastewater processing rate is increased, 304. The MBR container can be a container with a modular membrane bioreactor (MBR) cartridge, such as container 102 of FIG. 1. In one embodiment, the additional modular MBR cartridge is activated and the rate that the MBR container is set to receive, process, and discharge wastewater is increased in response to detecting the volumetric flow rate exceeds a first threshold value and detecting the mass flow rate is lower than or equal to a second threshold value. For example, in one embodiment, the rate that the MBR container is set to receive, process, and discharge wastewater is increased by at least a factor of 2. In another embodiment, the rate that the MBR container is set to receive, process, and discharge wastewater is increased by at least a factor of 4. In other embodiments, the rate can increased by any number supported by the MBR cartridges and the treated wastewater tolerance levels. Increasing the rate that the MBR container is set to receive, process, and discharge wastewater decreases the water cycle time in the container. For example, if a baseline water cycle time is four hours, the water cycle time after increasing the container's wastewater processing rate may be 1 or 2 hours. Although the MBR container has a fixed volume, activating an additional modular MBR cartridge and increasing the rate that the MBR container is set to process wastewater increases the throughput of the container. In one embodiment, increasing the rate that the MBR container is set to receive, process, and discharge wastewater can result in cleaner processed water.

Method 300 detects whether the volumetric flow rate has decreased, and whether the mass flow rate has increased, 306. In response to detecting that the volumetric flow rate has decreased and the mass flow rate has increased, an additional modular MBR cartridge in the MBR container is deactivated, and the MBR container's wastewater processing rate is decreased, 308. For example, in response to detecting the volumetric flow rate is lower than or equal to the first threshold value and the mass flow rate exceeds the second threshold value, the additional modular MBR cartridge in the container is deactivated, and the rate of receiving wastewater into the container, processing the received wastewater within the volume of the container, and discharging the processed wastewater from the container is decreased. According to one embodiment, decreasing the MBR container processing rate increases oxygen to meet Biochemical Oxygen Demand (BOD).

Figure 4:
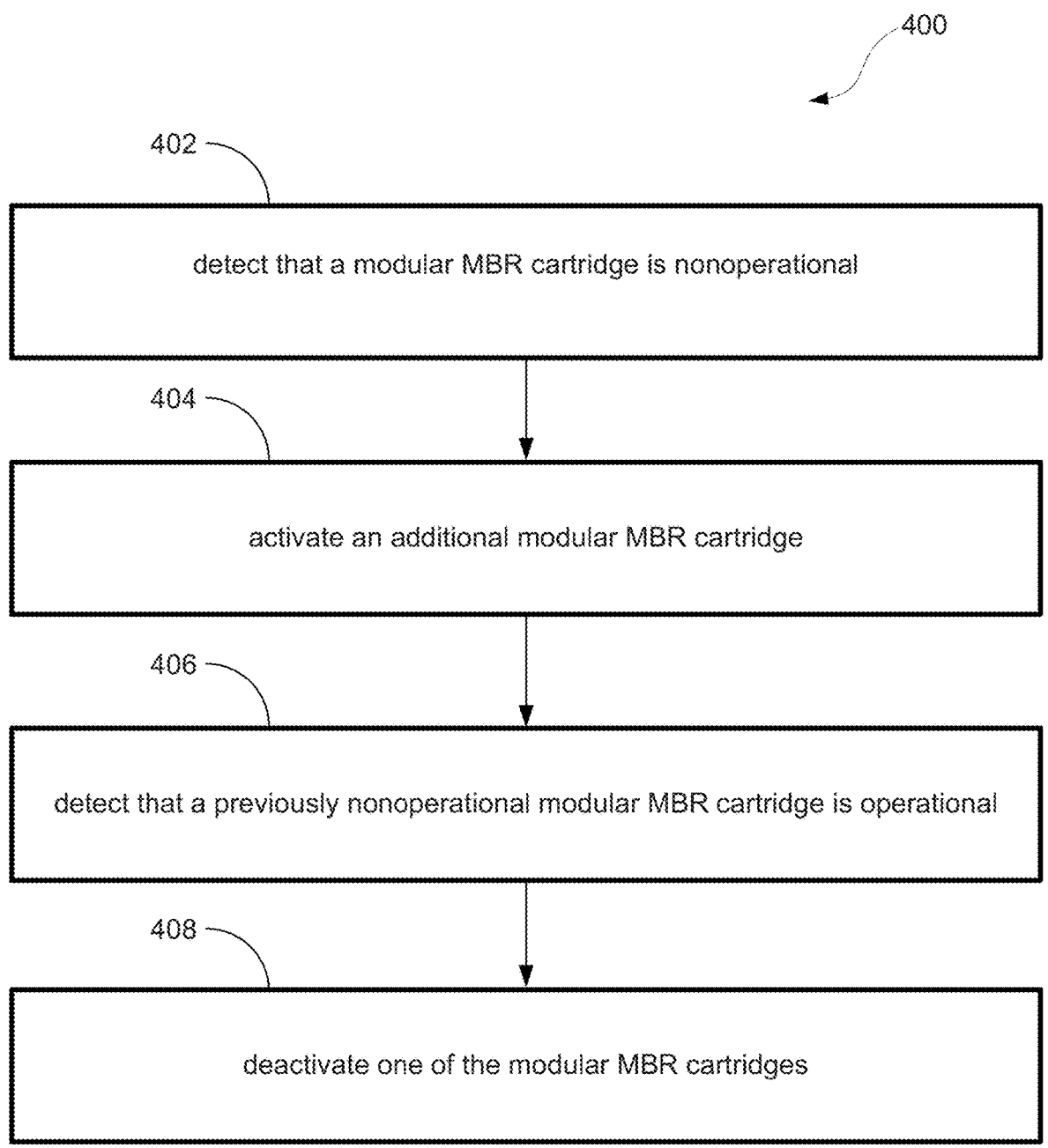
FIG. 4 is a flow diagram of a method of providing fault tolerant wastewater filtration with modular MBR cartridges according to one embodiment of the invention.

FIG. 4 is a flow diagram of a method of providing fault tolerant wastewater treatment via modular MBR cartridges according to one embodiment of the invention.

Method 400 detects that a modular MBR cartridge (e.g., modular MBR cartridge 104a in container 102 of FIG. 1) is nonoperational, 402. For example, a modular MBR cartridge could become nonoperational as a result of membrane fouling of an MBR filter. Another example leading to a nonoperational modular MBR cartridge is a damaged or worn MBR filter.

In response to determining a modular MBR cartridge is nonoperational, an additional modular MBR cartridge (e.g., modular MBR cartridge 104b of FIG. 1) is activated, 304. Although method 400 describes activating a single additional modular MBR cartridge, any number of modular MBR cartridges can be activated. In one embodiment, by activating an additional MBR cartridge, wastewater treatment with MBR filtration can continue uninterrupted despite a nonoperational MBR cartridge.

Similarly, an MBR cartridge can be activated due to other conditions. For example, if another MBR container is nonoperational (e.g., due to needing repairs or due to being replaced), one or more additional MBR cartridges in one or more MBR containers can be activated. In one such embodiment, a container can be repaired or replaced without compromising waste water throughput. In another example, if another WWTP's ability to sufficiently handle incoming wastewater is lacking (e.g., due to failures or reaching capacity), one or more additional MBR cartridges in one or more MBR containers can be activated in the WWTP. In yet another example, the WWTP can be upgraded to increase capacity by activating one or more additional MBR cartridges in one or more MBR containers. In one such embodiment, activating additional cartridges provides additional capacity without service interruption.

Method 400 detects if a previously nonoperational modular MBR cartridge (e.g., modular MBR cartridge 104a of FIG. 1) becomes operational, 406. In response to detecting that the previously nonoperational modular MBR cartridge is operational, one of the modular MBR cartridges in the container is deactivated. For example, if a previously nonoperational cartridge becomes operational and activated, one of the modular MBR cartridges is no longer needed to achieve the same level of wastewater processing, and can be deactivated. The modular MBR cartridge to be deactivated could be any activated cartridge. In another embodiment, a system can detect that a previously nonoperational cartridge is operational, but not activate that cartridge. In one such embodiment, that previously nonoperational cartridge can serve as a backup cartridge providing a fault tolerant MBR container.

One or more MBR cartridges can also be deactivated in response to detecting other conditions (e.g., activation or increase of capacity of another MBR container or WWTP). Although method 400 describes deactivating a single MBR cartridge, any number of MBR cartridges can be deactivated.

FIG. 5 is an illustration of system to utilize and/or implement an embodiment of the invention. As illustrated, system 500 includes bus communication means 518 for communicating information, and processor 510 coupled to bus 518 for processing information. The system further comprises storage memory 512 (alternatively referred to herein as main memory), coupled to bus 518 for storing information and instructions to be executed by processor 510. Main memory 512 also may be used for storing temporary variables or other intermediate information during execution of instructions by processor 510. The system also comprises static storage device 516 coupled to bus 518 for storing static information and instructions for processor 510, and data storage device 514 such as a magnetic disk or optical disk and its corresponding disk drive. Data storage device 514 is coupled to bus 518 for storing information and instructions.

The system may further be coupled to display device 520, such as a cathode ray tube (CRT) or a liquid crystal display (LCD) coupled to bus 518 through bus 526 for displaying information to a computer user. I/O device 522 may also be coupled to bus 518 through bus 526 for communicating information and command selections (e.g., alphanumeric data and/or cursor control information) to processor 510.

Another device, which may optionally be coupled to computer system 500, is a communication device 524 for accessing other nodes of a distributed system via a network in order to transmit platform independent alert messages as described above. Communication device 524 may include any of a number of commercially available networking peripheral devices such as those used for coupling to an Ethernet, token ring, Internet, or wide area network. Communication device 524 may further be a null-modem connection, or any other mechanism that provides connectivity between computer system 500 and other devices. Note that any or all of the components of this system illustrated in FIG. 5 and associated hardware may be used in various embodiments of the invention.

It will be appreciated by those of ordinary skill in the art that any configuration of the system may be used for various purposes according to the particular implementation. The control logic or software implementing embodiments of the invention can be stored in main memory 512, data storage device 514, or other storage medium locally or remotely accessible to processor 510.

It will be apparent to those of ordinary skill in the art that the system, method, and process described herein can be implemented as software stored in main memory 512 or static storage device 516 (e.g., read only memory) and executed by processor 510. This control logic or software may also be resident on an article of manufacture comprising a computer readable medium having computer readable program code embodied therein and being readable the mass storage device 514 and for causing processor 510 to operate in accordance with the methods and teachings herein.

Each component described in connection with FIG. 5 includes software or hardware, or a combination of these. Each and all components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration) may be provided via an article of manufacture including a non-transitory, tangible computer or machine readable storage medium, which provides content that represents instructions that can be executed. The content may result in a computer performing various functions/operations described herein.

A computer readable non-transitory storage medium includes any mechanism that provides (i.e., stores and/or transmits) information in a form accessible by a computer (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer readable non-transitory storage medium may also include a storage or database from which content can be downloaded. Said computer readable medium may also include a device or product having content stored thereon at a time of sale or delivery. Thus, delivering a device with stored content, or offering content for download over a communication medium may be understood as providing an article of manufacture with such content described herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize. These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

The invention claimed is:

1. A membrane bioreactor (MBR) cartridge comprising:
   a plurality of MBR filters, each of the plurality of MBR filters including one or more membranes;
   a filter coupler, the filter coupler coupling the plurality of MBR filters; and
   a coupling to a computer system that is configured to dynamically activate or deactivate the MBR cartridge to enable variable throughput in a wastewater processing container into which the MBR cartridge is placed.

2. The MBR cartridge of claim 1, wherein at least one material of the one or more membranes is selected based on quality requirements of effluent from the wastewater processing container.

3. The MBR cartridge of claim 1, wherein at least one of the one or more membranes is selected based on its ability to withstand an additional suction pressure for periods of time, the additional suction pressure being greater than a standard suction pressure.

4. The MBR cartridge of claim 1, wherein the MBR cartridge combines bio-reactive treatment processes with membrane separation processes.

5. The MBR cartridge of claim 1, wherein the computer system has control logic for performing the dynamic activation or deactivation of the MBR cartridge.

6. The MBR cartridge of claim 5, wherein the computer system is coupled to one or more sensors for monitoring volumetric flow rate in the wastewater processing container and the control logic performs the activation based on an increase in the volumetric flow rate.

7. The MBR cartridge of claim 6, wherein the computer system is coupled to one or more sensors for monitoring mass flow rate in the wastewater processing container and the control logic performs the activation based on the mass flow rate decreasing or remaining unchanged during the increase in the volumetric flow rate.

8. The MBR cartridge of claim 1, wherein the enabling of the variable throughput includes, based on a detection of an activation condition, enabling an increasing of a rate at which the wastewater treatment container is set to process wastewater.

9. The MBR cartridge of claim 1, further comprising, wherein the enabling of the variable throughput includes, based on a detection of a deactivation condition, performing at least one of decreasing a rate of receiving water into the wastewater treatment container, decreasing a rate of processing of wastewater within the wastewater treatment container, or decreasing a rate of discharging the wastewater from the wastewater treatment container.

10. The MBR cartridge of claim 9, wherein the enabling of the decreasing of the processing is based on increasing oxygen within the wastewater treatment container to meet Biochemical Oxygen Demand (BOD).

11. A method of treating wastewater comprising:
    based on an MBR cartridge being dynamically set to an activated state, using the MBR cartridge to treat wastewater in a wastewater processing container, the MBR cartridge being removably inserted into the wastewater processing container, the MBR cartridge including a plurality of MBR filters and a filter coupler, each of the plurality of MBR filters including one or more membranes, the filter coupler coupling the plurality of MBR filters; and
    based on the MBR cartridge being dynamically set to a deactivated state, preventing the MBR cartridge from being used to treat the wastewater in the wastewater treatment container.

12. The method of claim 11, wherein at least one material of the one or more membranes is selected based on quality requirements of effluent from the wastewater processing container.

13. The method of claim 11, wherein at least one of the one or more membranes is selected based on its ability to withstand an additional suction pressure for periods of time, the additional suction pressure being greater than a standard suction pressure.

14. The method of claim 11, wherein the MBR cartridge combines bio-reactive treatment processes with membrane separation processes.

15. The method of claim 11, wherein the MBR cartridge is coupled to a computer system having control logic for setting the MBR cartridge to the activated state or the deactivated state.

16. The method of claim 15, wherein the computer system is coupled to one or more sensors for monitoring volumetric flow rates in the wastewater processing container and the control logic performs the activation based on an increase in the volumetric flow rate.

17. The method of claim 16, wherein the computer system is coupled to one or more sensors for monitoring mass flow rates in the wastewater processing container and the control logic performs the activation based on the mass flow rate decreasing or remaining unchanged during the increase in the volumetric flow rate.

18. The method of claim 11, wherein the setting of the MBR cartridge to the activated state enables an increasing of a rate at which the wastewater treatment container is set to process the wastewater.

19. The method of claim 12, wherein the setting of the MBR cartridge to the deactivated state, is performed in conjunction with at least one of decreasing a rate of receiving water into the wastewater treatment container, decreasing a rate of processing of wastewater within the wastewater treatment container, or decreasing a rate of discharging the wastewater from the wastewater treatment container.

20. The method of claim 19, wherein the performing of the decreasing of the rate of the processing is based on increasing oxygen within the wastewater treatment container to meet Biochemical Oxygen Demand (BOD).

* * * * *

UNITED STATES PATENT AND TRADEMARK OFFICE
CERTIFICATE OF CORRECTION

| | | |
|---|---|---|
| PATENT NO. | : 10,836,663 B2 | Page 1 of 1 |
| APPLICATION NO. | : 16/135814 | |
| DATED | : November 17, 2020 | |
| INVENTOR(S) | : Reilly et al. | |

It is certified that error appears in the above-identified patent and that said Letters Patent is hereby corrected as shown below:

In the Claims

Column 8, Line 45, Claim 19, delete "12," and insert --11,-- therefor

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*